(12) United States Patent
Hwang et al.

(10) Patent No.: US 10,486,334 B2
(45) Date of Patent: Nov. 26, 2019

(54) METHOD FOR MANUFACTURING PLASTIC SUBSTRATE FOR ELECTROSTATIC PAINTING

(71) Applicant: Korea Kumho Petrochemical Co., Ltd., Seoul (KR)

(72) Inventors: Ho Soo Hwang, Daejeon (KR); Wan Sung Lee, Daejeon (KR); Dong Hwan Kim, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 266 days.

(21) Appl. No.: 15/293,426

(22) Filed: Oct. 14, 2016

(65) Prior Publication Data

US 2017/0106564 A1   Apr. 20, 2017

(30) Foreign Application Priority Data

Oct. 14, 2015   (KR) .......... 10-2015-0143386

(51) Int. Cl.
| | |
|---|---|
| B29B 9/10 | (2006.01) |
| B29C 48/00 | (2019.01) |
| B29B 7/90 | (2006.01) |
| B29C 45/00 | (2006.01) |
| B30B 11/08 | (2006.01) |
| C08J 3/20 | (2006.01) |
| C08J 5/00 | (2006.01) |

(Continued)

(52) U.S. Cl.
CPC .......... *B29B 9/10* (2013.01); *B29B 7/90* (2013.01); *B29C 45/0001* (2013.01); *B29C 48/022* (2019.02); *B30B 11/08* (2013.01); *C08J 3/203* (2013.01); *C08J 5/005* (2013.01); *B29C 48/03* (2019.02); *B29K 2101/12* (2013.01); *B29K 2105/162* (2013.01); *B29K 2105/167* (2013.01); *B29K 2507/04* (2013.01); *B29K 2995/0005* (2013.01); *B29L 2031/30* (2013.01); *C08J 2355/00* (2013.01); *C08J 2355/02* (2013.01)

(58) Field of Classification Search
None
See application file for complete search history.

(56) References Cited

U.S. PATENT DOCUMENTS

| | | | | |
|---|---|---|---|---|
| 2006/0183817 | A1* | 8/2006 | Keulen .......... | C08J 3/226 523/351 |
| 2010/0078194 | A1* | 4/2010 | Bhatt .......... | B82Y 30/00 174/110 SR |
| 2013/0207051 | A1* | 8/2013 | Ryu .......... | H01B 1/04 252/511 |

FOREIGN PATENT DOCUMENTS

| | | |
|---|---|---|
| KR | 10-2008-0053924 | 6/2008 |
| KR | 10-1090729 | 12/2011 |

(Continued)

OTHER PUBLICATIONS

European Search Report dated Mar. 29, 2017 in corresponding Appl. No. 16193982.2.

*Primary Examiner* — Michael P. Rodriguez
(74) *Attorney, Agent, or Firm* — H.C. Park & Associates, PLC

(57) ABSTRACT

A method of preparing a plastic substrate for electrostatic painting includes preparing a carbon nanotube pellet by molding carbon nanotube powder. The method also includes preparing a conductive resin composition by mixing 0.1 to 10 wt % of the carbon nanotube pellet, 0.1 to 20 wt % of carbon black, and 70 to 99 wt % of a thermoplastic polymer resin. The method further includes molding the conductive resin composition.

11 Claims, 2 Drawing Sheets

(51) Int. Cl.
*B29K 101/12* (2006.01)
*B29K 105/16* (2006.01)
*B29K 507/04* (2006.01)
*B29L 31/30* (2006.01)
*B29C 48/03* (2019.01)

(56) References Cited

FOREIGN PATENT DOCUMENTS

| | | |
|---|---|---|
| KR | 10-1197288 | 11/2012 |
| KR | 10-2015-0066261 | 6/2015 |
| WO | 2008041965 A2 | 4/2008 |
| WO | 2016165638 A1 | 10/2016 |

\* cited by examiner

METHOD FOR MANUFACTURING PLASTIC SUBSTRATE FOR ELECTROSTATIC PAINTING

CROSS-REFERENCE TO RELATED APPLICATION

This application claims priority from and the benefit of Korean Patent Application No. 10-2015-0143386, filed on Oct. 14, 2015, which is hereby incorporated by reference for all purposes as if fully set forth herein.

BACKGROUND

Field

The present invention relates to a method of preparing a plastic substrate for electrostatic painting, and more specifically, to a method of preparing a plastic substrate for electrostatic painting by mixing a thermoplastic polymer resin with a conductive material and molding the mixture.

Discussion of the Background

Generally, in the automotive industry, a painting process is conducted to improve the aesthetic function by providing a diversity of colors to the product. Specifically, a car body assembled on an assembly line is transferred to a painting line to perform a painting process for providing desired colors.

Such a painting process is carried out in the order of undercoating, top coating, drying, and clear coating processes. The undercoating process, also called a primer coating process, refers to a process to impart an anti-corrosive effect and adhesion of the paint before the top coating process, and based on this, desired colors may be provided in the top coating process.

Electrostatic painting, which is one of the methods used in the top coating process, is a painting method of adsorbing paint by imparting an electric charge to the sprayed paint and applying high voltage to an article to be painted. Specifically, a positive electrode is applied to an article to be painted and a negative electrode is applied to a spraying device, the sprayed paint particles are made to have (−) static electricity such that the paint particles are adsorbed to the article to be painted. When electrostatic painting is compared with typical spray painting, loss of the paint is smaller, the quality or performance of a painted layer is excellent, automatic equipment can be used, and painting can be performed regardless of the size of an article to be painted.

An article to be painted is necessarily subjected to a conductivity treatment to apply this electrostatic painting method to a plastic, and to this end, a primer treatment should be conducted to impart conductivity in the undercoating process.

However, this primer treatment requires additional devices, space, and costs, resulting in economic loss, and when the quality of the painted layer varies according to a primer coating thickness or a surface of an article to be painted is not uniformly treated with a primer, the electrostatic painting efficiency is lowered.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiment provide a method of preparing a plastic substrate for electrostatic painting to secure electrical conductivity of a substrate itself during electrostatic painting of a plastic substrate and allow omission of a conductive primer treatment, thereby improving economic efficiency, productivity and workability.

Additional aspects will be set forth in the detailed description which follows, and, in part will be apparent from the disclosure, or may be learned by practice of the inventive concept.

An exemplary embodiment includes a method of preparing a plastic substrate for electrostatic painting. The method includes (a) preparing a carbon nanotube pellet by molding carbon nanotube powder; (b) preparing a conductive resin composition by mixing 0.1 to 10 wt % of the carbon nanotube pellet, 0.1 to 20 wt % of carbon black and 70 to 99 wt % of a thermoplastic polymer resin. The method further includes (c) molding the conductive resin composition.

According to an exemplary embodiment, the molding may be performed by injecting the carbon nanotube powder into a rotary tablet press and applying pressure in step (a).

According to an exemplary embodiment, the pressure may be in a range of 100 to 700 kg/cm$^3$.

According to an exemplary embodiment, the rotary tablet press may have a punch size in a range of 1 to 8 mm.

According to an exemplary embodiment, a turntable of the rotary tablet press may have a rotational speed in a range of 10 to 60 rpm.

According to an exemplary embodiment, a carbon nanotube included in the carbon nanotube pellet may have a diameter of 50 nm or less and a length of 100 μm or less.

According to an exemplary embodiment, the carbon nanotube may have a bulk density in a range of 50 to 800 kg/m$^3$.

According to an exemplary embodiment, the carbon black may have a specific surface area in a range of 30 to 300 m$^2$/g and a dibutyl phthalate (DBP) oil absorption amount of 600 cc/100 mg or less.

According to an exemplary embodiment, the carbon black may have an average particle size of 100 nm or less.

According to an exemplary embodiment, the thermoplastic polymer resin may be a rubber-reinforced styrene-based resin.

According to an exemplary embodiment, the rubber-reinforced styrene-based resin may include at least one of an acrylonitrile-butadiene-styrene copolymer (ABS) resin, an acrylonitrile-acrylic rubber-styrene copolymer (AAS) resin, and an acrylonitrile-ethylene propylene rubber-styrene copolymer (AES) resin.

According to an exemplary embodiment, in step (c), the molding may be performed by extrusion molding, injection molding, or a combination thereof.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
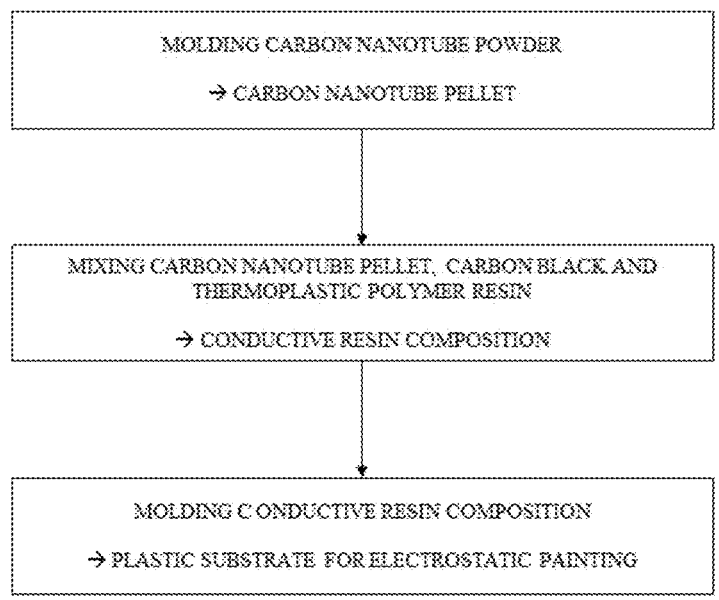
FIG. 1 illustrates a method of preparing a plastic substrate for electrostatic painting according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

The present invention is not limited to the exemplary embodiments disclosed below, and can be implemented in various types. Therefore, the exemplary embodiments are provided for complete disclosure of the present invention and to fully describe the scope of the present invention to those of ordinary skill in the art. Descriptions of irrelevant components are omitted from the drawings so as to clearly describe the exemplary embodiments of the present invention. Like elements are denoted by like reference numerals in the drawings.

Throughout this specification, it will be understood that when an element is referred to as being "connected" to another element, it can be "directly connected" to the other element or "electrically connected" to the other element with other elements therebetween. It will be further understood that when an element is referred to as "comprises" another element, the element is intended not to exclude one or more other elements, but to further include one or more other elements, unless the context clearly indicates otherwise.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

FIG. 1 illustrates a method of preparing a plastic substrate for electrostatic painting according to an exemplary embodiment. Referring to FIG. 1, a method of preparing a plastic substrate for electrostatic painting according to an exemplary embodiment includes (a) preparing a carbon nanotube pellet by molding carbon nanotube powder, (b) preparing a conductive resin composition by mixing 0.1 to 10 wt % of the carbon nanotube pellet, 0.1 to 20 wt % of carbon black, and 70 to 99 wt % of a thermoplastic polymer resin, and (c) molding the conductive resin composition.

A carbon nanotube and carbon black are materials for imparting electrical conductivity to a thermoplastic polymer resin which is nonconductive. A plastic substrate prepared by molding a resin composition in which the carbon nanotube and carbon black are mixed. Such a plastic substrate may be imparted with electrical conductivity due to the carbon nanotube and carbon black. By molding the resin with the carbon nanotube and carbon black, a surface resistance of the plastic substrate is significantly reduced to improve the electrostatic painting efficiency.

Examples of the method of synthesizing the carbon nanotube include an arc-discharge method, a pyrolysis method, a laser vaporization method, a plasma-enhanced chemical vapor deposition method, a thermal chemical vapor deposition method or the like, but any carbon nanotube prepared regardless of the synthesis method may be used.

Furthermore, according to the number of walls, the carbon nanotube may include at least one of a single wall carbon nanotube, a double wall carbon nanotube, a multi-wall carbon nanotube, and a cup-stacked carbon nanofiber in the form of a hollow tube including a plurality of stacked truncated graphene. For example, but not limiting, the carbon nanotube may be a multi-wall carbon nanotube due to many economic advantages associated with multi-wall carbon nanotubes.

When a carbon nanotube in powder form is used in step (a), a scattering problem due to a low bulk density and the consequent harmful effects to the health of workers are caused. To prevent this, a carbon nanotube pellet with improved bulk density prepared by molding carbon nanotube powder to a pellet form may be used.

When a conductive composite material is prepared by mixing the carbon nanotube pellet and a polymer resin, dispersibility can be enhanced by controlling the size and shape of both the carbon nanotube pellet and polymer resin to be similar. As a result, the deviation of the electrical conductivity and mechanical properties between each part of the composite material are minimized, allowing uniform physical properties regardless of a shape such as a bent, curved or concavo-convex shape.

Specifically, since a polymer resin used in preparation of a composite material is mainly in a pellet form, a layer separation phenomenon due to the difference in size or density of pellets can be suppressed by controlling the diameter, thickness, bulk density or the like of the carbon nanotube pellets and introducing the carbon nanotube pellets to an extruder.

In order to prepare the carbon nanotube pellet, in step (a), the molding may be performed by injecting the carbon nanotube powder into a rotary tablet press and applying pressure thereto. The rotary tablet press may be a tablet press commonly used to prepare tablets of medicine, food, etc.

When the carbon nanotube pellet is prepared using the rotary tablet press, only carbon nanotube powder can be used without adding other solvents or additives, and thus the plastic substrate for electrostatic painting, which is a final product, can exhibit electrical conductivity acceptable for electrostatic painting. The addition of solvents or additives to the carbon nanotube power when using the rotary tablet press may cause the density of the resulting carbon nanotube pellet to be too high making dispersion of the carbon nanotube pellet in the resin difficult or impossible.

Further, in step (a), the pressure may be in the range of 100 to 700 $kg/cm^3$, and preferably in the range of 300 to 500 $kg/cm^3$. When the pressure is less than 100 $kg/cm^3$, the carbon nanotube pellet may be easily destroyed, and when the pressure is more than 700 $kg/cm^3$, since the agglomerated carbon nanotube powder is unlikely to be dispersed in a resin, it is not possible to impart uniform electrical conductivity to the entire surface of the plastic substrate.

Moreover, in consideration of the properties such as productivity, a diameter, a thickness, an apparent density or the like of the carbon nanotube pellet, the rotary tablet press may have a punch size in the range of 1 to 8 mm, preferably in the range of 2 to 6 mm, and a turntable may have a rotational speed in the range of 10 to 60 rpm, and preferably in the range of 20 to 50 rpm.

Since the punch size of the rotary tablet press is a variable which defines a diameter of the carbon nanotube pellet, when the punch size is more than 8 mm, layer separation due to the size difference between the carbon nanotube pellet and the polymer resin pellet may occur, and when the punch size is less than 1 mm, durability, moldability and productivity of the pellet may be reduced.

In step (b), a conductive resin composition may be prepared by mixing the carbon nanotube pellet prepared in step (a), carbon black, and a thermoplastic polymer resin so as to impart conductivity to the thermoplastic polymer resin which is nonconductive.

Here, 0.1 to 10 wt % of the carbon nanotube pellet, 0.1 to 20 wt % of the carbon black, and 70 to 99 wt % of the thermoplastic polymer resin may be mixed based on the total weight of the conductive resin composition.

When each content of the carbon nanotube pellet and the carbon black is less than 0.1 wt %, impartment of sufficient conductivity to a plastic substrate for electrostatic painting which is a final product is not possible, and when the content of the carbon nanotube pellet is more than 10 wt % or the content of the carbon black is more than 20 wt %, mechanical properties of the plastic substrate for electrostatic painting can be deteriorated. For example, if too much carbon black is added the surface resistivity of the plastic substrate may be non-uniform causing painting problems.

Further, the carbon nanotube included in the carbon nanotube pellet may have a diameter of 50 nm or less, a length of 100 μm or less, and a bulk density in the range of 50 to 800 kg/m$^3$.

When the carbon nanotube pellets and the thermoplastic polymer resin are mixed, the carbon nanotubes included in the carbon nanotube pellets may form a network structure in the thermoplastic polymer resin.

Here, the carbon nanotube having a diameter of 50 nm or less, a length of 100 μm or less and a bulk density in the range of 50 to 800 kg/m$^3$ may have an advantageous structure in terms of formation of the network structure, and as a result, a contact frequency between networks decreases, and a contact resistance is also reduced accordingly, and thus electrical conductivity of the plastic substrate for electrostatic painting can be further enhanced.

The term "bulk density" as used herein refers to an apparent density of the carbon nanotube in the raw material state, and may be expressed by a value obtained by dividing a weight of the carbon nanotube by a volume thereof.

Further, the carbon black, like the carbon nanotube, may be used as a conductive material for imparting conductivity to a thermoplastic polymer resin. Here, in order to impart uniform conductivity, the carbon black may have a dibutyl phthalate (DBP) oil absorption amount of 600 cc/100 mg or less, a specific surface area in the range of 30 to 300 m$^2$/g, and an average particle size of 100 nm or less.

The term "DBP oil absorption amount" as used herein refers to an absorption amount of dibutyl phthalate per unit weight of the carbon black. The higher the DBP oil absorption amount is, the larger a specific surface area of the carbon black is, and excellent conductivity is exhibited accordingly.

The carbon black may be one or more selected from the group consisting of Ketjen black, acetylene black, furnace black, channel black, Timcal carbon black, and a mixture thereof. For example, but not limitation, the carbon black may be Ketjen black with good conductivity.

The carbon black has properties in which carbon particles may be easily detached due to scratching or friction while having excellent conductivity, and thus has low wear resistance. When an excess amount of the carbon black is only used as a conductive material, the moldability of the plastic substrate may be lowered.

When the carbon nanotube and the carbon black are applied together, a plastic substrate exhibiting improved conductivity can be prepared while the content of carbon black can be reduced, and a surface resistance can be stabilized due to the network structure formed in the thermoplastic polymer resin by the carbon nanotube.

Moreover, when the carbon black is inserted and fixed in the network structure, more uniform conductivity can be exhibited as compared to the case of only using the carbon nanotube pellet.

Furthermore, the conductive resin composition may include one or more additives. For example, the conductive resin composition may include at least one of a flame retardant, a flame retardant aid, a lubricant, a plasticizer, a heat stabilizer, an anti-drip agent, an antioxidant, a compatibilizer, a light stabilizer, a pigment, a dye, and an inorganic additive. The type of the additive may be suitably selected according to a specific purpose of a plastic substrate for electrostatic painting which is a final product.

When the conductive resin composition includes the additive, the content of the additive may be in the range of 0.1 to 10 wt % based on the total weight of the conductive resin composition. When the content of the additive is less than 0.1 wt %, the conductive resin composition does not exhibit any benefit from the additive or exhibits little benefit. When the content of the additive is more than 10 wt %, the resulting plastic substrate may not have electrical conductivity that is acceptable for electrostatic painting.

The thermoplastic polymer resin may be a rubber-reinforced styrene-based resin. The rubber-reinforced styrene-based resin is a polymer in which rubbery polymers are dispersed in the form of particles in a matrix formed of an aromatic vinyl-based copolymer. The rubber-reinforced styrene-based resin may be prepared by adding aromatic vinyl-based monomers and vinyl-based monomers polymerizable with the aromatic vinyl-based monomers in the presence of the rubbery polymers and subsequently polymerizing the various monomers.

Examples of the rubber-reinforced styrene-based resin include at least one of an acrylonitrile-butadiene-styrene copolymer (ABS) resin, acrylonitrile-acrylic rubber-styrene copolymer (AAS) resin, and acrylonitrile-ethylene propylene rubber-styrene copolymer (AES) resin. However, the rubber-reinforced styrene-based resin is not limited thereto.

The rubber-reinforced styrene-based resin may be prepared using a known polymerization method including, without limitation, emulsion polymerization, suspension polymerization, and bulk polymerization. For example, the rubber-reinforced styrene-based resin may be prepared by only using a styrene-based graft copolymer resin or mixing a styrene-based graft copolymer resin with a styrene-based copolymer resin and extruding. Here, an extrusion temperature may be, without limitation, in the range of 200 to 300° C.

In the case of the bulk polymerization, a rubber-reinforced styrene-based resin may be prepared by only a one step reaction process without separately preparing a styrene-based graft copolymer resin and a styrene-based copolymer resin. Furthermore, when a styrene-based graft copolymer resin and a styrene-based copolymer resin are used together, the styrene-based graft copolymer resin and styrene-based copolymer resin may be suitably mixed in consideration of compatibility.

Further, in step (c), a plastic substrate for electrostatic painting, which is a final product, may be prepared by molding the conductive resin composition prepared in step (b). In step (c), the molding may be extrusion molding, injection molding, or a combination thereof. For example, but without limitation, the molding may be a combination of extrusion molding and injection molding.

Since the plastic substrate for electrostatic painting prepared according to the aforementioned method exhibits uniform and improved inherent conductivity and mechanical properties, an undercoating process including a conductive primer treatment can be omitted when performing electrostatic painting, thereby reducing costs and increasing painting efficiency.

Hereinafter, examples of the an exemplary embodiment will be described in further details.

Examples 1 to 3 and Comparative Examples 1 to 4

After each component listed in the following Table 1 was mixed according to a content ratio in a mixer for 3 minutes and extruded using a twin-screw extruder, a sample (100 mm×100 mm×3 mm) for measurement of physical properties was prepared using an injection machine.

Carbon nanotube pellet: K-Nanos 210T (Kumho Petrochemical Co., Ltd.)
Carbon black: Hiblack 150B (Korea Carbon Black Co, Ltd.)
Thermoplastic polymer resin: H2938L (Kumho Petrochemical Co., Ltd.))

TABLE 1

| Classification | Carbon nanotube pellet (wt %) | Carbon black (wt %) | Thermoplastic polymer resin (wt %) |
|---|---|---|---|
| Example 1 | 1.5 | 1 | 97.5 |
| Example 2 | 1.5 | 5 | 93.5 |
| Example 3 | 1.5 | 10 | 88.5 |
| Comparative Example 1 | 0 | 0 | 100.0 |
| Comparative Example 2 | 0.5 | 0 | 99.5 |
| Comparative Example 3 | 1.0 | 0 | 99.0 |
| Comparative Example 4 | 1.5 | 0 | 98.5 |

Experimental Example 1: Measurement of Surface Resistance According to Content Ratio of Each Component A surface resistance of each sample prepared according to Examples 1 to 3 and Comparative Examples 1 to 4 was measured in accordance with ASTM D257, and the results are shown in the following Table 2.

TABLE 2

| Classification | Surface resistance (Ω/sq) |
|---|---|
| Example 1 | $10^{12}$~$10^{13}$ |
| Example 2 | $10^{9}$~$10^{10}$ |
| Example 3 | $10^{7}$~$10^{8}$ |

TABLE 2-continued

| Classification | Surface resistance (Ω/sq) |
|---|---|
| Comparative Example 1 | — |
| Comparative Example 2 | $10^{13}$~$10^{14}$ |
| Comparative Example 3 | $10^{13}$~$10^{14}$ |
| Comparative Example 4 | $10^{13}$~$10^{14}$ |

Referring to Table 2, a plastic substrate prepared without adding a conductive material in Comparative Example 1 has an excessively high surface resistance, so that the measurement was impossible.

Further, the surface resistances of the plastic substrates prepared in Examples 1 to 3 in which both the carbon nanotube pellet and carbon black were used was measured to be lower than those of the plastic substrate prepared in Comparative Examples 2 to 4 in which only a carbon nanotube pellet was used as a conductive material. Particularly, the surface resistance of the plastic substrate of Example 3, in which the content of carbon black was increased to 10 wt %, is reduced about 50% as compared to Comparative Examples 2 to 4, from which it can be determined that electrical conductivity is markedly enhanced.

It can be seen from the result that when a plastic substrate for electrostatic painting is prepared by using both of the carbon nanotube pellet and carbon black, excellent conductivity is obtained as compared with the case where one of them is selectively used, painting efficiency can also increase, and this effect becomes conspicuous as an amount of used carbon black is raised within a predetermined range.

Experimental Example 2: Measurement of Surface Resistance Per Area

A plastic substrate for a side mirror of an automotive vehicle was prepared by extruding and injecting each of the composition of Example 3 and the thermoplastic polymer resin of Comparative Example 1 using a mold of predetermined form, and the results are shown in FIG. 2.

With respect to a plastic substrate for a side mirror of an automotive vehicle in FIG. 2A, a surface resistance of the same areas as the areas represented by the numbers in FIG. 2B was measured in accordance with ASTM D257, and the results are shown in the following Table 3.

TABLE 3

| Area | Surface resistance (Ω/sq) |
|---|---|
| 1 | $1.1 \times 10^{9}$ |
| 2 | $1.3 \times 10^{9}$ |
| 3 | $5.0 \times 10^{8}$ |
| 4 | $5.2 \times 10^{9}$ |
| 5 | $2.3 \times 10^{9}$ |
| 6 | $1.1 \times 10^{9}$ |
| 7 (side) | $7.8 \times 10^{8}$ |
| 8 | $1.6 \times 10^{9}$ |
| 9 | $1.5 \times 10^{8}$ |
| 10 (side) | $1.7 \times 10^{9}$ |

Figure 2A:
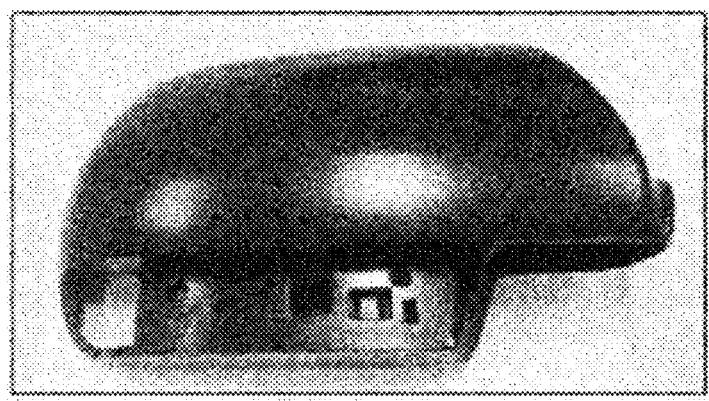
FIG. 2A and FIG. 2B show a plastic substrate for electrostatic painting prepared according to an exemplary embodiment.
Figure 2B:
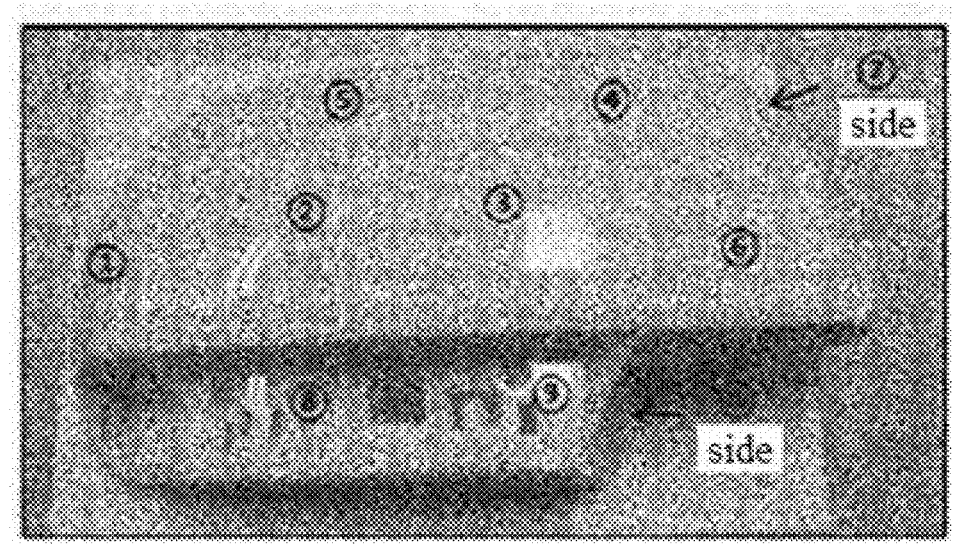

Referring to FIG. 2A, FIG. 2B, and Table 3, in the case of a plastic substrate for electrostatic painting prepared by extrusion molding and injection molding after mixing carbon nanotube pellets and carbon black as a conductive material with a thermoplastic polymer resin, surface resistance values in each area were measured to be uniform within the low range of $10^{8}$ to $10^{9}$ Ω/sq.

As such, it was determined that when a predetermined amount of a conductive material is mixed with a thermoplastic polymer resin and both of the carbon nanotube in pellet form and carbon black are used as a conductive material, a plastic substrate, which is a final product, can have enhanced conductivity and relatively uniform conductivity can be realized for the entire area of the surface of the substrate.

According to an aspect of the present invention, when a plastic substrate for electrostatic painting is prepared by molding the thermoplastic polymer resin in which carbon nanotube pellets and carbon black which are conductive materials are mixed, high electrical conductivity can be imparted to a plastic substrate itself, and economic efficiency, productivity and workability can be improved by omitting a conductive primer treatment accompanied during electrostatic painting of an existing nonconductive substrate.

Furthermore, according to an aspect of the present invention, when a carbon nanotube molded in a pellet form is used during mixing with a polymer resin, existing scattering problems attributable to a direct use of carbon nanotube powder and detrimental effects on the health of workers can be resolved, and a layer separation phenomenon due to the density difference with a polymer resin can be prevented, thereby realizing uniform conductivity and mechanical properties for the final product.

The effects of the present invention are not limited to the above-mentioned effects, and it should be understood that the effects of the present invention include all effects that can be inferred from the configuration of the invention described in the detailed description of the invention or the appended claims.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in an exemplary sense only and not for purposes of limitation. For example, each component referred to as a single type may be divided, and components referred to as being divided may be combined as a single type.

Therefore, the scope of the invention is defined not by the detailed description of the invention, but by the appended claims, and all differences within the scope will be construed as being included in the present invention.

What is claimed is:

1. A method of preparing a plastic substrate for electrostatic painting, comprising:
    (a) preparing a carbon nanotube pellet by molding carbon nanotube powder;
    (b) preparing a conductive resin composition by mixing 0.1 to 10 wt % of the carbon nanotube pellet, 0.1 to 20 wt % of carbon black, and 70 to 99 wt % of a rubber-reinforced styrene-based resin; and
    (c) molding the conductive resin composition by extrusion at a temperature in a range of 200° C. to 300° C.,
    wherein the mixing of step (b) comprises mixing the carbon nanotube pellet and the carbon black at a weight ratio of 1.5:5 to 1.5:10.

2. The method of claim 1, wherein, in step (a), the molding is performed by injecting the carbon nanotube powder into a rotary tablet press and applying pressure.

3. The method of claim 2, wherein the pressure is in a range of 100 to 700 kg/cm$^3$.

4. The method of claim 2, wherein the rotary tablet press has a punch size in a range of 1 to 8 mm.

5. The method of claim 4, wherein a turntable of the rotary tablet press has a rotational speed in a range of 10 to 60 rpm.

6. The method of claim 1, wherein a carbon nanotube included in the carbon nanotube pellet has a diameter of 50 nm or less and a length of 100 μm or less.

7. The method of claim 6, wherein the carbon nanotube has a bulk density in a range of 50 to 800 kg/m$^3$.

8. The method of claim 1, wherein the carbon black has a specific surface area in a range of 30 to 300 m$^2$/g and a dibutyl phthalate (DBP) oil absorption amount of 600 cc/100 mg or less.

9. The method of claim 8, wherein the carbon black has an average particle size of 100 nm or less.

10. The method of claim 1, wherein the rubber-reinforced styrene-based resin comprises at least one of an acrylonitrile-butadiene-styrene copolymer (ABS) resin, an acrylonitrile-acrylic rubber-styrene copolymer (AAS) resin, and an acrylonitrile-ethylene propylene rubber-styrene copolymer (AES) resin.

11. The method of claim 1, wherein, in step (c), the molding is performed by extrusion molding, injection molding, or a combination thereof.

* * * * *